(12) United States Patent
Liu et al.

(10) Patent No.: US 11,100,244 B2
(45) Date of Patent: Aug. 24, 2021

(54) FILE PACKAGING AND UNPACKAGING METHODS, APPARATUSES, AND NETWORK DEVICES

(71) Applicant: Advanced New Technologies Co., Ltd., George Town (KY)

(72) Inventors: Huan Liu, Hangzhou (CN); Sen Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,553

(22) Filed: May 29, 2020

(65) Prior Publication Data
US 2020/0293677 A1 Sep. 17, 2020

Related U.S. Application Data

(63) Continuation of application No. PCT/CN2019/073946, filed on Jan. 30, 2019.

(30) Foreign Application Priority Data

Apr. 17, 2018 (CN) .......................... 201810345096.3

(51) Int. Cl.
*G06F 21/62* (2013.01)
*G06F 16/174* (2019.01)
(Continued)

(52) U.S. Cl.
CPC ........ *G06F 21/6218* (2013.01); *G06F 16/116* (2019.01); *G06F 16/1744* (2019.01); *G06F 21/602* (2013.01)

(58) Field of Classification Search
CPC ............. G06F 21/6218; G06F 16/1744; G06F 21/602; G06F 16/116; H04L 41/0843; H04L 41/085; H04L 67/34
See application file for complete search history.

(56) References Cited

U.S. PATENT DOCUMENTS 10,628,822 B1 * 4/2020 Belleville ............ G06Q 20/363
2006/0235863 A1 * 10/2006 Khan .................. H04L 41/0843
(Continued)

FOREIGN PATENT DOCUMENTS

CN        1801881      7/2006
CN      101370212      2/2009
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Abiy Getachew
(74) *Attorney, Agent, or Firm* — Fish & Richardson P.C.

(57) ABSTRACT

At least one to-be-packaged file is obtained. A to-be-packaged file of the at least one to-be-packaged file is compressed to generate a compressed file. A storage location identifier is generated, based on a security level of the to-be-packaged file, where the storage location identifier indicates a storage location of a decompressed file obtained after decompression of the compressed file, and where the storage location includes a memory or a local disk. The compressed file and additional information comprising the storage location identifier are packaged to obtain a file package.

15 Claims, 4 Drawing Sheets

(51) Int. Cl.
*G06F 16/11* (2019.01)
*G06F 21/60* (2013.01)

(56) References Cited

U.S. PATENT DOCUMENTS

| | | | | |
|---|---|---|---|---|
| 2012/0054730 | A1* | 3/2012 | Michishita | G06F 8/654 |
| | | | | 717/169 |
| 2013/0018904 | A1* | 1/2013 | Mankala | G06F 16/93 |
| | | | | 707/756 |
| 2013/0173559 | A1* | 7/2013 | Chen | G06F 16/11 |
| | | | | 707/674 |
| 2014/0279973 | A1 | 9/2014 | Kelley et al. | |
| 2015/0052354 | A1 | 2/2015 | Purohit | |
| 2015/0052366 | A1 | 2/2015 | Bachu et al. | |

FOREIGN PATENT DOCUMENTS

| | | |
|---|---|---|
| CN | 103620606 | 3/2014 |
| CN | 105022644 | 11/2015 |
| CN | 106022014 | 10/2016 |
| CN | 106326768 | 1/2017 |
| CN | 106599702 | 4/2017 |
| CN | 107003907 | 8/2017 |
| CN | 108647527 | 10/2018 |
| TW | I271625 | 1/2007 |
| TW | 201327232 | 7/2013 |
| TW | I476676 | 3/2015 |
| WO | WO 2016000623 | 1/2016 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appln No. PCT/CN2019/073946, dated Apr. 28, 2020, 10 pages (with English translation).
European Extended Search Report in European Application No. 19787752.5, dated Jan. 19, 2021, 9 pages.
pkware.chachefly.net [online], "Appnote: APPNOTE.TXT—.ZIP File Format Specification", Sep. 29, 2006, retrieved on Apr. 15, 2021, retrieved from URL <https:/ /pkware. cachefl y.net/webdocs/ APPN OTB/APPN OTE-6 .3 .O.TXT>, 49 pages.

* cited by examiner

FILE PACKAGING AND UNPACKAGING METHODS, APPARATUSES, AND NETWORK DEVICES

CROSS-REFERENCE TO RELATED APPLICATIONS

This application is a continuation of PCT Application No. PCT/CN2019/073946, filed on Jan. 30, 2019, which claims priority to Chinese Patent Application No. 201810345096.3, filed on Apr. 17, 2018, and each application is hereby incorporated by reference in its entirety.

TECHNICAL FIELD

The present specification relates to the field of Internet technologies, and in particular, to file packaging and unpackaging methods and apparatuses, and network devices.

BACKGROUND

Augmented reality (AR) is a technology for adding a virtual model to an image shot by a photographing module of a device. Such technology can enable a real environment and a virtual model to coexist on the same image through superposition, thereby providing users with sensory experience beyond reality. In an AR implementation process, a client providing an AR function can first obtain a file package. The file package is generated by packaging multiple AR material files that have been processed, for example, compressed and encrypted. The client can unpackage the file package to obtain multiple AR material files, and save them on a local disk. When necessary, the client can read the AR material files from the local disk and display them on a screen through rendering.

SUMMARY

To alleviate problems in related technologies, the present specification provides file packaging and unpackaging methods and apparatuses, and network devices.

According to a first aspect of implementations of the present specification, a file packaging method is provided, where the method includes the following: obtaining at least one to-be-packaged file; compressing a to-be-packaged file of the at least one to-be-packaged file to generate a compressed file; generating a storage location identifier based on a security level of the to-be-packaged file, where the storage location identifier indicates a storage location of a decompressed file obtained after decompression of the compressed file, and the storage location includes a memory or a local disk; and packaging the compressed file and additional information that includes the storage location identifier to obtain a file package.

Optionally, the additional information further includes an encrypted file name corresponding to a file name of the decompressed file stored on the local disk.

Optionally, the encrypted file name is generated by using an irreversible encryption algorithm.

Optionally, the storage location of the decompressed file corresponding to a resource configuration file or a script file is in a memory.

Optionally, the security level corresponds to a file extension or a file size of the to-be-packaged file.

Optionally, the packaging the compressed file and additional information that includes the storage location identifier includes the following: packaging the additional information and the compressed file in a customized format, where the customized format includes arranging the additional information in front of the compressed file.

According to a second aspect of implementations of the present specification, a file unpackaging method is provided, where the method includes the following: unpackaging an obtained file package to obtain at least one compressed file and corresponding additional information that are included in the file package, where the additional information includes a storage location identifier, the storage location identifier indicates a storage location of a decompressed file obtained after decompression of the compressed file, and the storage location includes a memory or a local disk; and decompressing the compressed file to obtain the decompressed file, and storing the decompressed file in a corresponding location based on the storage location identifier.

Optionally, the additional information further includes an encrypted file name corresponding to a file name of the decompressed file stored on the local disk.

Optionally, the method further includes the following: receiving a file operation instruction for the decompressed file, passing an input parameter to a file opening interface, and then performing a file operation, where for the decompressed file stored in the memory, the input parameter is a memory address of the file in the memory; for the decompressed file stored on the local disk, the input parameter is an encrypted file name of the file.

According to a third aspect of implementations of the present specification, a file packaging apparatus is provided, where the apparatus includes the following: an acquisition module, configured to obtain at least one to-be-packaged file; a compression module, configured to compress a to-be-packaged file of the at least one to-be-packaged file to generate a compressed file; a generation module, configured to generate a storage location identifier based on a security level of the to-be-packaged file, where the storage location identifier indicates a storage location of a decompressed file obtained after decompression of the compressed file, and the storage location includes a memory or a local disk; and a packaging module, configured to package the compressed file and additional information that includes the storage location identifier to obtain a file package.

Optionally, the additional information further includes an encrypted file name corresponding to a file name of the decompressed file stored on the local disk.

Optionally, the encrypted file name is generated by using an irreversible encryption algorithm.

Optionally, the storage location of the decompressed file corresponding to a resource configuration file or a script file is in a memory.

Optionally, the security level corresponds to a file extension or a file size of the to-be-packaged file.

Optionally, the packaging module is configured to: package the additional information and the compressed file in a customized format, where the customized format includes arranging the additional information in front of the compressed file.

According to a fourth aspect of implementations of the present specification, a file unpackaging apparatus is provided, where the apparatus includes the following: an unpackaging module, configured to unpackage an obtained file package to obtain at least one compressed file and corresponding additional information that are included in the file package, where the additional information includes a storage location identifier, the storage location identifier indicates a storage location of a decompressed file obtained after decompression of the compressed file, and the storage location includes a memory or a local disk; and a decompression module, configured to decompress the compressed file to obtain the decompressed file, and store the decompressed file in a corresponding location based on the storage location identifier.

Optionally, the additional information further includes an encrypted file name corresponding to a file name of the decompressed file stored on the local disk.

Optionally, the apparatus further includes a file operation module, configured to: receive a file operation instruction for the decompressed file, pass an input parameter to a file opening interface, and then perform a file operation, where for the decompressed file stored in the memory, the input parameter is a memory address of the file in the memory; for the decompressed file stored on the local disk, the input parameter is an encrypted file name of the file.

According to a fifth aspect of implementations of the present specification, a network device is provided, including the following: a processor; and a memory, configured to store a processor executable instruction, where the processor is configured to: obtain at least one to-be-packaged file; compress a to-be-packaged file of the at least one to-be-packaged file to generate a compressed file; generate a storage location identifier based on a security level of the to-be-packaged file, where the storage location identifier indicates a storage location of a decompressed file obtained after decompression of the compressed file, and the storage location includes a memory or a local disk; and package the compressed file and additional information that includes the storage location identifier to obtain a file package.

According to a sixth aspect of implementations of the present specification, a network device is provided, including the following: a processor; and a memory, configured to store a processor executable instruction, where the processor is configured to: unpackage an obtained file package to obtain at least one compressed file and corresponding additional information that are included in the file package, where the additional information includes a storage location identifier, the storage location identifier indicates a storage location of a decompressed file obtained after decompression of the compressed file, and the storage location includes a memory or a local disk; and decompress the compressed file to obtain the decompressed file, and store the decompressed file in a corresponding location based on the storage location identifier.

The technical solutions provided in the implementations of the present specification can include the following beneficial effects:

In the present specification, in a file packaging process, a storage location identifier is generated based on a security level of a to-be-packaged file, a storage location includes a memory or a local disk, and the storage location identifier and a compressed file of the to-be-packaged file are packaged together to generate a file package. With the identifier, after the file package is unpackaged, a decompressed file generated by decompressing the compressed file can be stored in the memory or the local disk based on instruction of the storage location identifier. Based on the solutions in the implementations, the file storage location can be flexibly selected based on the security level of the file. For example, a file with a higher security level can be stored in the memory by using the solutions in the implementations, and can be read, written, or performed other operations in the memory, thus reducing a risk of leakage when saving a local file, and improving data security.

It should be understood that the previous general description and the following detailed description are merely examples and explanations, and cannot limit the present specification.

BRIEF DESCRIPTION OF DRAWINGS

The accompanying drawings here are incorporated in the present specification, become a part of the present specification, show implementations that comply with the present specification, and are used with the present specification to explain a principle of the present specification.

DESCRIPTION OF IMPLEMENTATIONS

Figure 1:
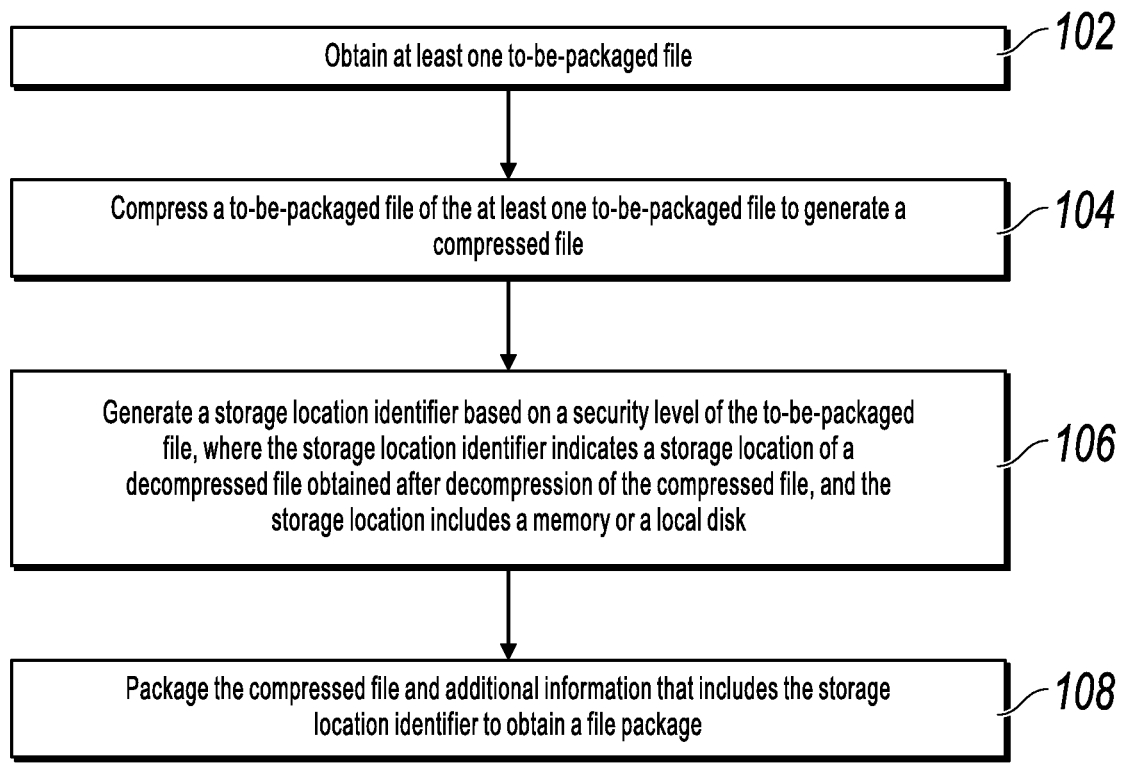
FIG. 1 is a flowchart illustrating a file packaging method, according to an example implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present specification. On the contrary, the implementations are only examples of apparatuses and methods that are described in the appended claims in detail and consistent with some aspects of the present specification.

The terms used in the present specification are merely for illustrating specific implementations, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information should not be limited by these terms. These terms are only used to differentiate between information of the same type. For example, without departing from the scope of the present specification, first information can also be referred to as second information, and similarly, the second information can also be referred to as the first information. Depending on the context, for example, the word "if" used here can be explained as "while", "when", or "in response to determining".

After obtaining a file package, a client can unpackage the file package and needs to store the file for reading. To improve security of file storage, implementations of the present specification provide file packaging and unpackaging solutions. In a file packaging process, a storage location identifier is generated based on a security level of a to-be-packaged file, a storage location includes a memory or a local disk, and the storage location identifier and a compressed file of the to-be-packaged file are packaged together to generate a file package. With the identifier, after the file package is unpackaged, a decompressed file generated by decompressing the compressed file can be stored in the memory or the local disk based on instruction of the storage location identifier. Based on the solutions in the implementations, the file storage location can be flexibly selected based on the security level of the file. A file with a higher security level can be stored in the memory by using the solutions in the implementations, and can be read, written, or performed other operations in the memory, thus reducing a risk of leakage when saving a local file, and improving data security. The following describes the implementations of the present specification in detail.

The implementations of the present specification include two stages of the processing procedure. One stage is to package the to-be-packaged file to generate a file package. The other stage is to unpackage the file package, which can be understood as an inverse process of packaging in essence. First, the packaging process is described, as shown in FIG. 1. FIG. 1 is a flowchart illustrating a file packaging method, according to an example implementation of the present specification. The method includes the following steps:

Step 102: Obtain at least one to-be-packaged file.

Step 104: Compress a to-be-packaged file of the at least one to-be-packaged file to generate a compressed file.

Step 106: Generate a storage location identifier based on a security level of the to-be-packaged file, where the storage location identifier indicates a storage location of a decompressed file obtained after decompression of the compressed file, and the storage location includes a memory or a local disk.

Step 108: Package the compressed file and additional information that includes the storage location identifier to obtain a file package.

In some service scenarios, the purpose of file packaging includes the following: On a network side, one or more files may need to be transmitted to a peer of the network, and the one or more files need to be packaged as one file package, to improve a transmission speed and ensure transmission security. In view of the previous description, the file packaging method in the present implementation can be applied to any service scenario that needs file packaging.

Because the implementations of the present specification include multiple file processing, for the purposes of distinction, file naming in the implementations is first described as follows:

To-be-packaged file: an original file that needs to be packaged, which is located in a network device on a packaging side.

Compressed file: a file generated after the to-be-packaged file is compressed.

Decompressed file: a file obtained after decompression of the compressed file; the decompressed file is located in a network device on an unpackaging side. In fact, the decompressed file can be understood to be the same as the to-be-packaged file, because the two files have the same content in essence. Certainly, the two files can also be understood as different files, because the two files are located in different devices and may be assigned with different file attribute values, such as different file storage times, different storage locations, etc.

In the implementations, the security of the file after unpackaging needs to be considered. For example, in the AR scenario, the file package is provided by a server that provides the AR service, and the file package is sent by the server to the client over a network. The client runs on user device, and after receiving the file package, the client needs to unpackage the file package to obtain the file, so as to read the file and provide the AR service. Therefore, on the user device side, the file has certain security risks. For example, the running environment on the user device side may be relatively complex, and there may be multiple other applications installed in the user device, which may include a malicious third party. The file is stored in the user device, facing security problems such as leakage or being tampered with by a malicious third party.

To improve the security of the file in the device on the unpackaging side, at the packaging stage in the implementations, a storage location of the file in the device on the unpackaging side can be flexibly configured as needed. An electronic device is usually equipped with a memory, and the memory is used to temporarily store operation data in a CPU and data that exchange with external memories such as hard disks. Based on the characteristic of temporary storage of data in the memory, in the implementations, some files can be stored in the memory, so as to reduce the risk of leakage when locally saving files and improve data security. In addition, considering that the memory storage space is limited and some files do not need high security performance, some files can also be stored on a local disk in the implementations.

In view of the previous description, two security levels can be divided in the implementations. A file with a higher security level can correspond to a storage location identifier of a memory, and a file with a lower security level can correspond to a storage location identifier of a local disk. In practice, the division of security levels can be flexibly configured based on the needs of different service scenarios. For example, a resource configuration file or a script file usually includes sensitive information such as resource configuration information or program code, and can correspond to a higher security level. In some other examples, pictures or videos files can be usually stored on local disks due to their large file sizes. In view of the previous description, the security level can correspond to the extension in the file name or the file size. For example, the resource configuration file or the script file is usually in text format or in the HyperText Markup Language (HTML) format, and the extension of such file is ".txt" or ".html". In such case, the file name of the to-be-packaged file is read, and then the extension is further read from the file name, thus automatically and quickly determining that the security level of the to-be-packaged file is higher. If the read extension is in video or picture format such as ".mp4" or ".avi", it can be determined that the security level of the to-be-packaged file is lower. In some other examples, the security level can also correspond to the file size. For example, for relatively large files such as videos or pictures, a file whose file size is greater than 5M can be set to have a lower security level, and a file whose file size is less than 5M can be set to have a higher security level, and so on. When security levels are divided, in the implementations, a corresponding storage location identifier can be quickly generated based on the security level of the to-be-packaged file.

For a file stored on the local disk, to reduce a security risk faced by the file after the storage, in the implementations of the present specification, the additional information can further include an encrypted file name corresponding to the file name of the decompressed file stored on the local disk, and the decompressed file can be named by using the encrypted file name. Therefore, the file is stored in the device on the unpackaging side, and the encrypted file name can improve the privacy of the file and reduce the risk of file leakage.

For example, the encrypted file name can be generated by using an irreversible encryption algorithm, such as the Message Digest Algorithm MD5 (MD5), the Secure Hash Algorithm (SHA1), the SHA256 algorithm, etc. The irreversible encryption algorithm is characterized by the fact that no key is needed in the encryption process, and plaintexts are input and directly processed as ciphertexts by using the encryption algorithm. The encrypted data cannot be decrypted until the plaintexts are input again and processed again by using an irreversible encryption algorithm to obtain the same ciphertexts, which are then identified again by the system, so that the encrypted data can be actually decrypted. In practice, file information of the to-be-packaged file can be used as plaintexts to generate the encrypted file name, which can include, for example, one or more file attribute information such as a file name, a file size, a file type, a creation date, a modification date, etc. Plaintexts used for different files need to be unique.

Optionally, if necessary, the additional information includes other file-related information such as the original file name and file modification time, which can be flexibly configured in practice and is not limited in the implementations.

In the implementations, a corresponding compressed file and additional information can be generated for each to-be-packaged file. If there are multiple to-be-packaged files, there are multiple groups of corresponding compressed files and additional information. Then, all the compressed files and additional information can be packaged to obtain a file package. The packaging process can be performed in a customized format as needed, to improve the security of the file package, for example, encryption can be performed, a file format can be customized, and so on. Because the additional information indicates the storage location identifier of the decompressed file, to improve the decompression speed, the additional information can be arranged in front of the compressed file, so that after the file package is unpackaged, the storage location identifier of the additional information can be first read to obtain in advance the storage location of the decompressed file that will be obtained in a subsequent decompression process, thereby improving the file decompression efficiency.

Figure 2:
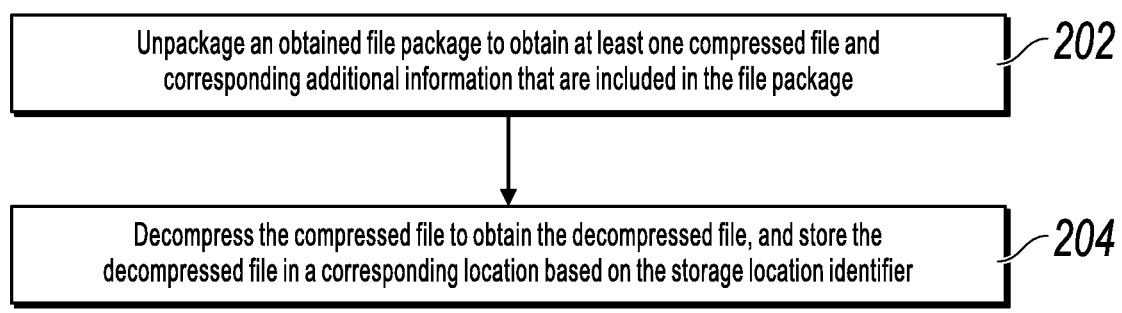
FIG. 2 is a flowchart illustrating a file unpackaging method, according to an example implementation of the present specification.

After the packaging stage is completed, the file package is obtained and can be transmitted to other network devices for use. The following describes the file unpackaging process. FIG. 2 is a flowchart illustrating a file unpackaging method, according to an example implementation of the present specification. The method includes the following steps:

Step 202: Unpackage an obtained file package to obtain at least one compressed file and corresponding additional information that are included in the file package.

The additional information includes a storage location identifier, the storage location identifier indicates a storage location of a decompressed file obtained after decompression of the compressed file, and the storage location includes a memory or a local disk.

Step 204: Decompress the compressed file to obtain the decompressed file, and store the decompressed file in a corresponding location based on the storage location identifier.

The file unpackaging process in the implementations can be understood as an inverse process of the previously described file packaging process. After receiving the file package, a network device on an unpackaging side can unpackage the file package in the customized format used in the file packaging process, to obtain one or more compressed files and additional information corresponding to each compressed file. The additional information includes the storage location identifier, and the decompressed file obtained after decompression of the compressed file under the instruction of the storage location identifier can be stored in the corresponding location based on the storage location identifier. For example, a file with a higher security level can be stored in the memory by using the solutions in the implementations, and can be read, written, or performed other operations in the memory, thus reducing a risk of leakage when saving a local file, and improving data security.

It can be understood from the previous analysis that, the additional information can further include the encrypted file name. For the decompressed file stored on the local disk, the decompressed file can be named by using the encrypted file name. For example, the encrypted file name can be used as the file name of the decompressed file, or other encryption identifiers can be added to the encrypted file name to serve as the file name. Based on the previous processing, the privacy of the file can be improved and the risk of file leakage can be reduced. Because the file is stored on the local disk by using the encrypted file name, other applications in the device cannot know the file type or related information such as a specific source of the file, thus reducing the security risk.

The file is stored in the device. Applications can perform file operations such as file reading or writing by invoking an interface of the file system. The file system is a method and data structure that are used by the operating system to specify file storage on the storage device or partition, i.e., a method for organizing files on the storage device. The software responsible for managing and storing file information in the operating system is referred to as a file management system or file system for short. The file system includes three parts: the interface of the file system; a set of software that manipulates and manages objects; and objects and attributes. From the perspective of the system, the file system is the system that organizes and allocates the space of the file storage device, and is responsible for file storage and protection and search of stored files. To be specific, the file system is responsible for creating files for users; storing, reading, modifying, and dumping files; controlling file access; revoking files when they are no longer in use; and so on.

In the file system, to read data from a file, an application first invokes a file open function of the operating system and sends a file name, so as to pass a path of the file to the function to open the file. After being invoked, the function obtains a sequence number allocated by the operating system, i.e., a file handle (also referred to as a file descriptor). The file handle is a unique basis for identifying the opened file. In the implementations, when a file needs to be operated, the file can be first opened by invoking the file opening interface, and then the file can be operated accordingly by invoking functions such as fread, fwrite, or fseek.

The following describes the file operations. For example, assume that a certain function in the AR functional module of the client is triggered, indicating that a certain file stored on the local disk is to be opened for AR display. It can be determined, based on the triggering, that the file operation instruction on the decompressed file is received. Based on the existing client implementation solution, the file operation instruction includes the original file name. Based on the record of the additional information (the additional information can include the original file name of the to-be-packaged file), it is understood that the file stored on the local disk is to be operated. A corresponding encrypted file name is determined based on the original file name, and the encrypted file name is passed to the file open function (such as the fopen function) used to open the file on the local disk. The file is opened by using the fopen function to obtain the file descriptor. Then, file operations such as reading (fread) and writing (fwrite) are performed. If a file stored in the memory is to be operated, the memory address of the decompressed file in the memory is determined based on the original file name, the memory address is passed to the file open function (such as the fmemopen function) used to open the file in the memory, and the file is opened by using the fmemopen function to obtain the file descriptor. Then, file operations such as reading (fread) and writing (fwrite) are performed.

The following describes the solutions of the present specification in detail by using an implementation.

An AR scenario is used as an example in the present implementation. In such scenario, a packaging side is a server providing an AR service, and an unpackaging side is a corresponding client. The server needs to combine various types of material files needed by a three-dimensional (3D) engine into one file to facilitate network transmission. The file packaging process of the server includes the following: preparing multiple to-be-packaged files that need to be combined into one file.

Each to-be-packaged file is processed as follows: (1) compressing the to-be-packaged file; and (2) generating additional information, including the following: a storage location identifier generated based on a security level of the to-be-packaged file, which is referred to as loadingType in the present implementation, and includes two types: localFile and Memory, where localFile indicates that the storage location is in a local disk, and Memory indicates that the storage location is in a memory. Optionally, localFile is suitable for media files with non-text content, such as pictures, audios, and videos; and Memory is suitable for text files with small sizes, such as resource configuration files or script files that have higher security levels and include sensitive information. Optionally, automatic selection can be performed based on the extension, for example, a mapping relationship between the extension and the storage location is established in advance, and a corresponding storage location identifier can be determined by reading the extension of the to-be-packaged file.

Optionally, in the present implementation, the original file name fileName of the to-be-packaged file and the encrypted file name generated based on the file information such as fileName are further obtained. The irreversible encryption algorithm can be used, that is, the original file name cannot be obtained by decrypting the encrypted file name. For example, the fileName can be used to generate an MD5 hash string for implementation.

Figure 3:
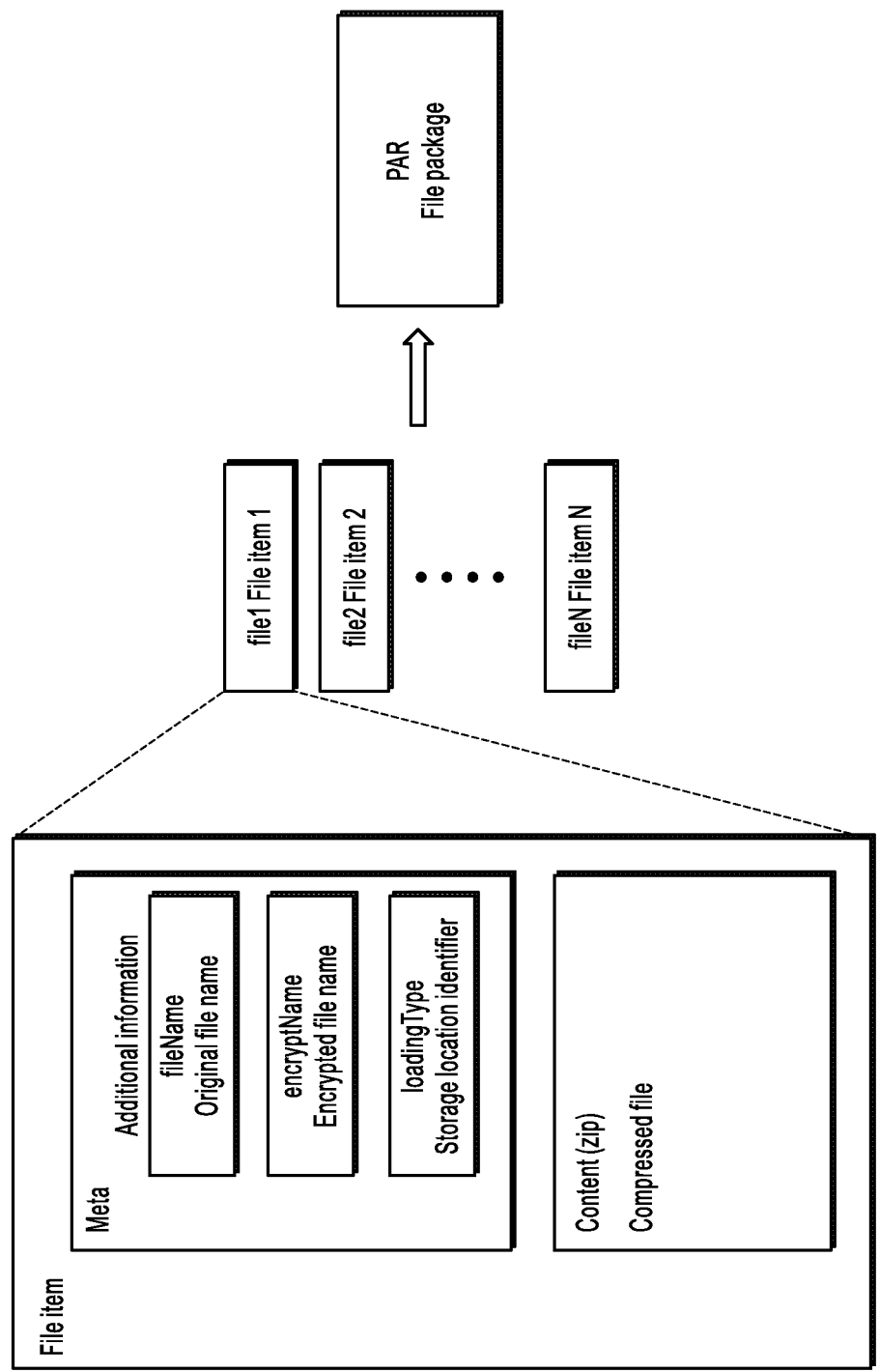
FIG. 3 is a schematic diagram illustrating packaging, according to an example implementation of the present specification.

Various compressed files and corresponding additional information are packaged. FIG. 3 is a schematic diagram illustrating packaging, according to an example implementation of the present specification. Each compressed file (referred to as content in FIG. 3) and corresponding additional information (referred to as Meta in FIG. 3) form one file item (where Meta is arranged in front of content), and various file items are connected in series (file1 to fileN in the figure), and packaged in a customized format to obtain a file package (referred to as a PAR package in FIG. 3).

At the unpackaging stage, the client can download the file package locally, and then the 3D engine needs to read the content of all files in the file package. First, the file package is unpackaged in the customized format to read each compressed file and the corresponding additional information. The storage location identifier is read from the additional information.

LocalFile: The compressed file is decompressed to obtain the decompressed file, which is saved under the name of encryptName in the additional information. For such files, file operations are as follows: Assume that a certain function in the AR functional module of the client is triggered, indicating that a certain file stored on the local disk is to be opened for AR display. It can be determined, based on the triggering, that the file operation instruction is received. Based on the existing client implementation solution, the file operation instruction includes the original file name. Based on the record of the additional information, it is understood that the file stored on the local disk is to be operated. A corresponding encrypted file name is determined based on the original file name, and the encrypted file name is passed to the file open function (such as the fopen function) used to open the file on the local disk. The file is opened by using the fopen function to obtain the file descriptor. Then, file operations such as reading (fread) and writing (fwrite) are performed.

Memory: The decompression process is to obtain the pointer address of the content of the decompressed file in the file package, and then decompress the pointer address in the memory. The decompressed content is stored in the memory. For such files, file operations are as follows: A file operation instruction is received, and the file operation instruction includes the original file name. It is determined, based on the record of the additional information, that a file stored in the memory is to be operated. The memory address of the decompressed file in the memory is determined based on the original file name, the memory address is passed to the file open function (such as the fmemopen function) used to open the file in the memory, and the file is opened by using the fmemopen function to obtain the file descriptor. Then, file operations such as reading (fread) and writing (fwrite) are performed.

Corresponding to the previously described implementations of the file packaging method/file unpackaging method, the present specification further provides implementations of a file packaging apparatus/a file unpackaging apparatus and a network device that the apparatus is applied to.

Figure 4:
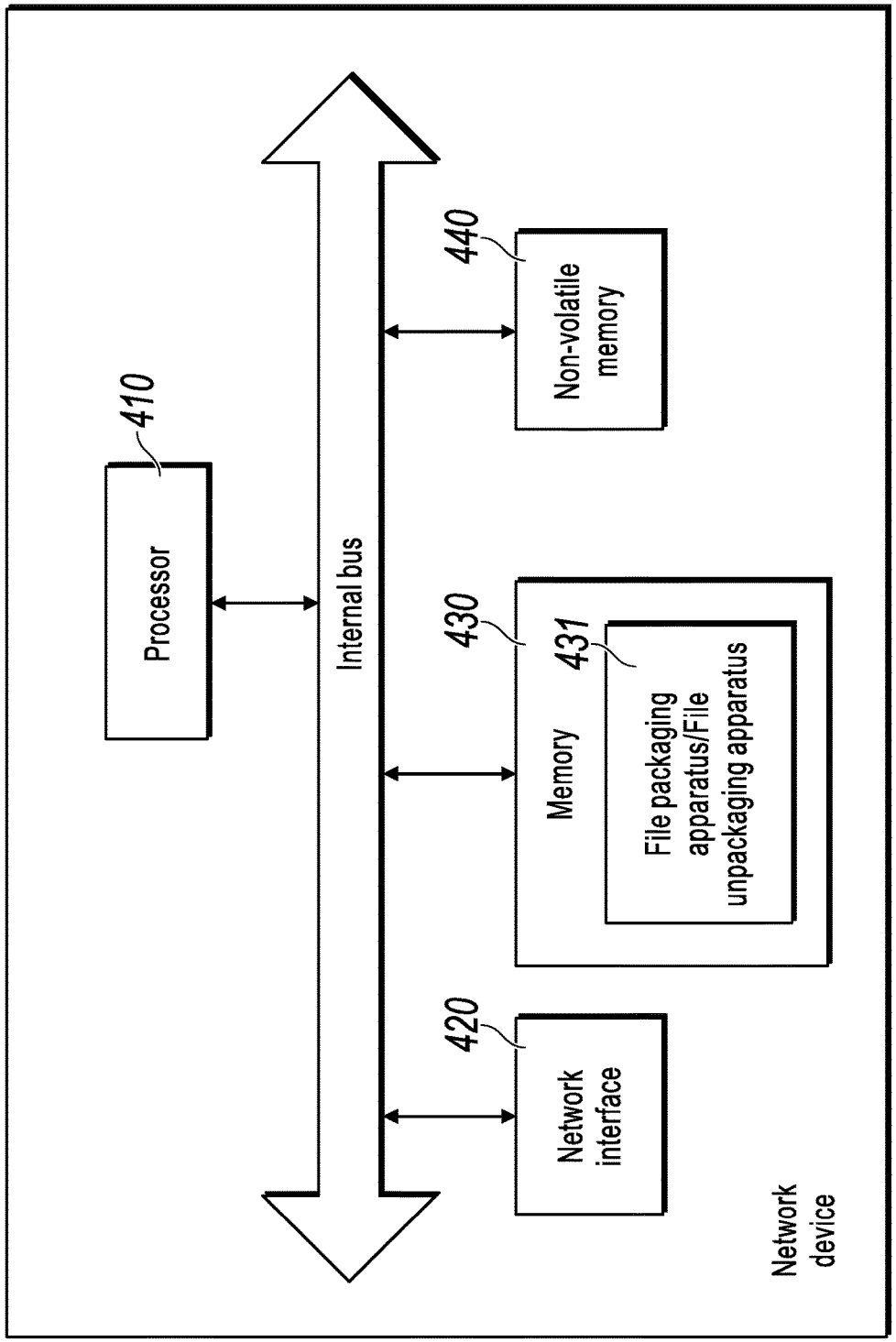
FIG. 4 is a diagram illustrating a hardware structure of a device in which a file packaging apparatus/a file unpackaging apparatus is located, according to the present specification.

The implementations of the file packaging apparatus/file unpackaging apparatus in the present specification can be applied to the network device, such as a server or terminal device. The apparatus implementations can be implemented by software, or can be implemented by hardware or a combination of software and hardware. For example, the apparatus implementations are implemented by software. A logical apparatus is formed when a processor of file packaging/file unpackaging where the apparatus is located reads a corresponding computer program instruction in a non-volatile memory into the memory for running. In terms of hardware, FIG. 4 is a diagram illustrating a hardware structure of a device in which a file packaging apparatus/a file unpackaging apparatus is located, according to the present specification. In addition to the processor 410, memory 430, network interface 420, and non-volatile memory 440 shown in FIG. 4, the server or the electronic device in which the apparatus 431 is located in the implementation generally can further include other hardware based on an actual function of the device. Details are omitted here for simplicity.

Figure 5:
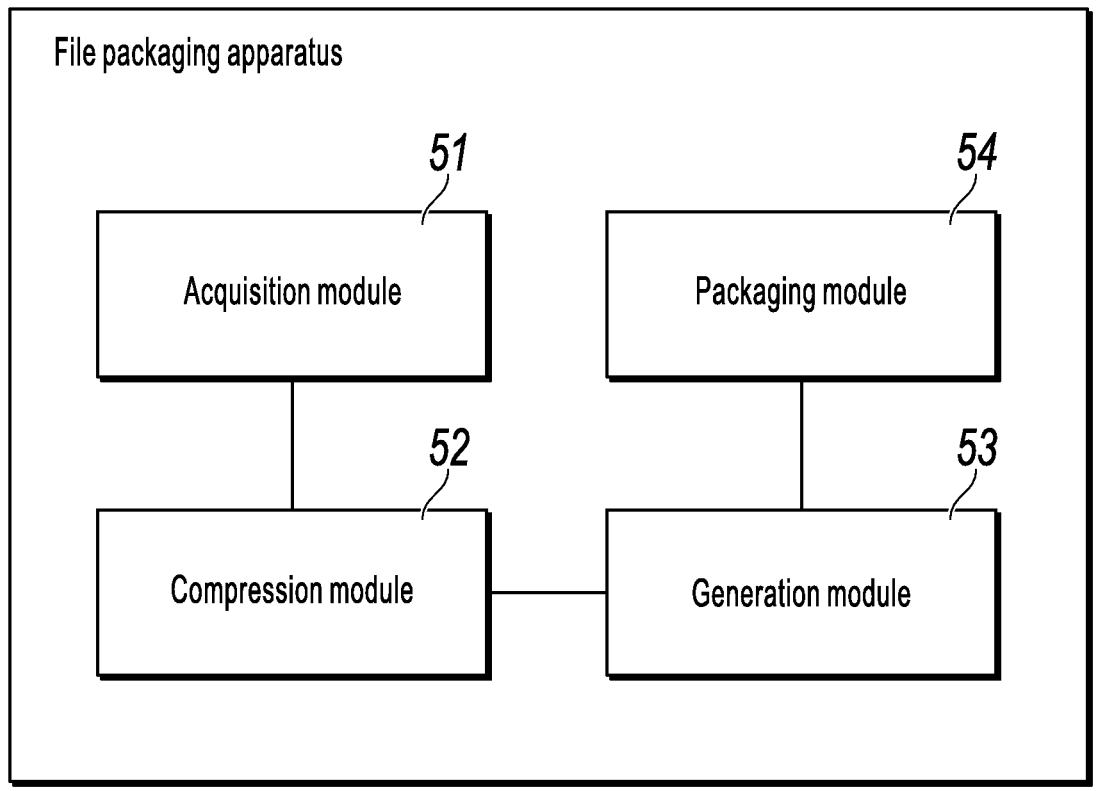
FIG. 5 is a block diagram illustrating a file packaging apparatus, according to an example implementation of the present specification.

FIG. 5 is a block diagram illustrating a file packaging apparatus, according to an example implementation of the present specification. The apparatus includes the following: an acquisition module 51, configured to obtain at least one to-be-packaged file; a compression module 52, configured to compress a to-be-packaged file of the at least one to-be-packaged file to generate a compressed file; a generation module 53, configured to generate a storage location identifier based on a security level of the to-be-packaged file, where the storage location identifier indicates a storage location of a decompressed file obtained after decompression of the compressed file, and the storage location includes a memory or a local disk; and a packaging module 54, configured to package the compressed file and additional information that includes the storage location identifier to obtain a file package.

Optionally, the additional information further includes an encrypted file name corresponding to a file name of the decompressed file stored on the local disk.

Optionally, the encrypted file name is generated by using an irreversible encryption algorithm.

Optionally, the storage location of the decompressed file corresponding to a resource configuration file or a script file is in a memory.

Optionally, the security level corresponds to a file extension or a file size of the to-be-packaged file.

Optionally, the packaging module is configured to: package the additional information and the compressed file in a customized format, where the customized format includes arranging the additional information in front of the compressed file.

Figure 6:
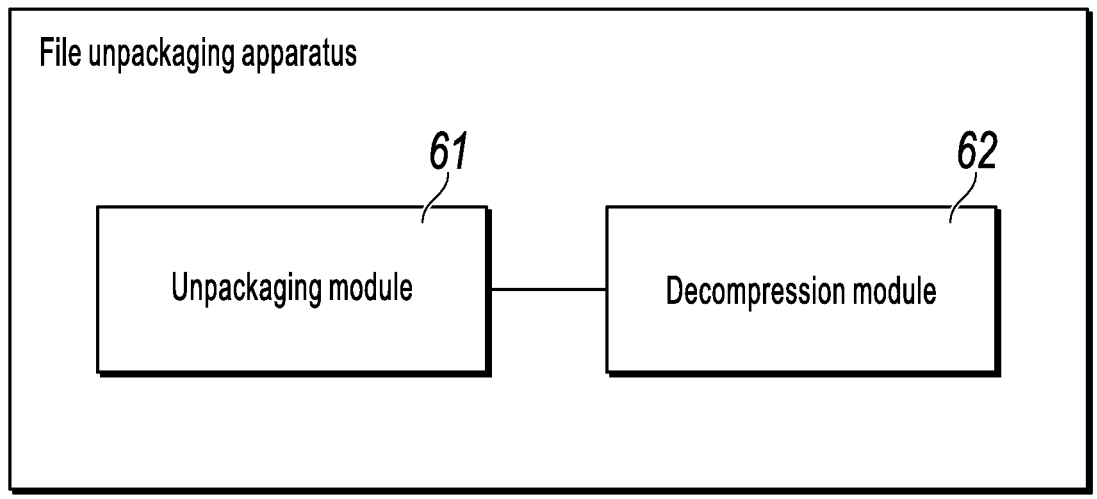
FIG. 6 is a block diagram illustrating a file unpackaging apparatus, according to an example implementation of the present specification.

FIG. 6 is a block diagram illustrating a file unpackaging apparatus, according to an example implementation of the present specification. The apparatus includes the following: an unpackaging module 61, configured to unpackage an obtained file package to obtain at least one compressed file and corresponding additional information that are included in the file package, where the additional information includes a storage location identifier, the storage location identifier indicates a storage location of a decompressed file obtained after decompression of the compressed file, and the storage location includes a memory or a local disk; and a decompression module 62, configured to decompress the compressed file to obtain the decompressed file, and store the decompressed file in a corresponding location based on the storage location identifier.

Optionally, the additional information further includes an encrypted file name corresponding to a file name of the decompressed file stored on the local disk.

Optionally, the additional information includes the original file name; the apparatus further includes a file operation module, configured to: obtain a file operation instruction, where the file operation instruction includes an original file name of a to-be-operated file; search for a corresponding decompressed file based on the original file name; and pass a storage address of an input parameter to a file opening interface, and then perform a file operation, where for the decompressed file stored in the memory, the input parameter is a memory address of the file in the memory; for the decompressed file stored on the local disk, the input parameter is an encrypted file name of the file.

Correspondingly, the present specification further provides a network device, including the following: a processor; and a memory, configured to store a processor executable instruction, where the processor is configured to: obtain at least one to-be-packaged file; compress a to-be-packaged file of the at least one to-be-packaged file to generate a compressed file; generate a storage location identifier based on a security level of the to-be-packaged file, where the storage location identifier indicates a storage location of a decompressed file obtained after decompression of the compressed file, and the storage location includes a memory or a local disk; and package the compressed file and additional information that includes the storage location identifier to obtain a file package.

Correspondingly, the present specification further provides a network device, including the following: a processor; and a memory, configured to store a processor executable instruction, where the processor is configured to: unpackage an obtained file package to obtain at least one compressed file and corresponding additional information that are included in the file package, where the additional information includes a storage location identifier, the storage location identifier indicates a storage location of a decompressed file obtained after decompression of the compressed file, and the storage location includes a memory or a local disk; and decompress the compressed file to obtain the decompressed file, and store the decompressed file in a corresponding location based on the storage location identifier.

For an implementation process of functions and roles of each module in the previously described file packaging apparatus/file unpackaging apparatus, references can be made to an implementation process of a corresponding step in the previously described methods. Details are omitted here for simplicity.

Because an apparatus implementation basically corresponds to a method implementation, for related parts, references can be made to related descriptions in the method implementations. The previously described apparatus implementations are only examples. The modules described as separate components can be or does not have to be physically separated. Components displayed as modules can be or does not have to be physical modules, can be located at one position, or can be distributed on multiple network modules. Some or all of the modules can be selected depending on an actual need to achieve the objectives of the solutions of the present specification. A person of ordinary skill in the art can understand and implement the implementations of the present specification without creative efforts.

The specific implementations of the present specification are described previously. Other implementations are within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

A person skilled in the art can easily figure out another implementation of the present specification after thinking over the specification and practicing the present application here. The present specification is intended to cover any variations, uses, or adaptations of the present specification, and these variations, uses, or adaptations follow the general principles of the present specification and include common knowledge or conventional techniques that are not disclosed in the technical field of the present specification. The specification and the implementations are merely considered as examples, and the actual scope and the spirit of the present specification are pointed out by the following claims.

It should be understood that the present specification is not limited to the precise structures that have been previously described and shown in the drawings, and various modifications and changes can be made without departing from the scope of the present specification. The scope of the present specification is limited by the appended claims only.

The previous descriptions are merely example implementations of the present specification, but are not intended to limit the present specification. Any modification, equivalent replacement, or improvement made without departing from the spirit and principle of the present specification shall fall within the protection scope of the present specification.

What is claimed is:

1. A computer-implemented method for file packaging, comprising:
   obtaining, by a server, at least one to-be-packaged file;
   generating, by the server, a compressed file by compressing a to-be-packaged file of the at least one to-be-packaged file;
   generating, by the server, a storage location identifier based on a security level of the to-be-packaged file,
      wherein the storage location identifier indicates a storage location of a decompressed file in a terminal device, wherein the decompressed file is obtained after decompression of the compressed file by the terminal device,
      wherein the security level of the to-be-packaged file is high when the to-be-packaged file comprises a resource configuration file or a script file, wherein the security level of the to-be-packaged file is low when the to-be-packaged file comprises a video file or an image file,
      and wherein the storage location is in a memory in the terminal device when the security level is high, and wherein the storage location is in a local disk in the terminal device when the security level is low; and
   generating, by the server, a file package, wherein the file package comprises the compressed file and additional information, and wherein the additional information comprises the storage location identifier.

2. The computer-implemented method of claim 1, wherein the additional information further comprises an encrypted file name corresponding to a file name of the decompressed file when the storage location of the decompressed file is in the local disk in the terminal device.

3. The computer-implemented method of claim 2, wherein the encrypted file name is generated using an irreversible encryption algorithm.

4. The computer-implemented method of claim 1, wherein the security level is determined based on at least one of a file extension or a file size of the to-be-packaged file.

5. The computer-implemented method of claim 1, wherein the generating a file package comprises:
   generating, by the server, a file package by of appending the compressed file after the additional information.

6. A non-transitory, computer-readable medium storing one or more instructions executable by a computer system to perform operations comprising:
   obtaining, by a server, at least one to-be-packaged file;
   generating, by the server, a compressed file by compressing a to-be-packaged file of the at least one to-be-packaged file;
   generating, by the server, a storage location identifier based on a security level of the to-be-packaged file,
      wherein the storage location identifier indicates a storage location of a decompressed file in a terminal device, wherein the decompressed file is obtained after decompression of the compressed file by the terminal device,
      wherein the security level of the to-be-packaged file is high when the to-be-packaged file comprises a resource configuration file or a script file, wherein the security level of the to-be-packaged file is low when the to-be-packaged file comprises a video file or an image file,
      and wherein the storage location is in a memory in the terminal device when the security level is high, and wherein the storage location is in a local disk in the terminal device when the security level is low; and
   generating, by the server, a file package, wherein the file package comprises the compressed file and additional information, and wherein the additional information comprises the storage location identifier.

7. The non-transitory, computer-readable medium of claim 6, wherein the additional information further comprises an encrypted file name corresponding to a file name of the decompressed file when the storage location of the decompressed file is in the local disk in the terminal device.

8. The non-transitory, computer-readable medium of claim 7, wherein the encrypted file name is generated using an irreversible encryption algorithm.

9. The non-transitory, computer-readable medium of claim 6, wherein the security level is determined based on at least one of a file extension or a file size of the to-be-packaged file.

10. The non-transitory, computer-readable medium of claim 6, wherein the generating a file package comprises:
    generating, by the server, a file package by appending the compressed file after the additional information.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       obtaining, by a server, at least one to-be-packaged file;
       generating, by the server, a compressed file by compressing a to-be-packaged file of the at least one to-be-packaged file;
       generating, by the server, a storage location identifier based on a security level of the to-be-packaged file,
          wherein the storage location identifier indicates a storage location of a decompressed file in a terminal device, wherein the decompressed file is obtained after decompression of the compressed file by the terminal device,
          wherein the security level of the to-be-packaged file is high when the to-be-packaged file comprises a resource configuration file or a script file, wherein the security level of the to-be-packaged file is low when the to-be-packaged file comprises a video file or an image file,
          and wherein the storage location is in a memory in the terminal device when the security level is high, and wherein the storage location is in a local disk in the terminal device when the security level is low; and generating, by the server, a file package, wherein the file package comprises the compressed file and additional information, and wherein the additional information comprises the storage location identifier.

12. The computer-implemented system of claim 11, wherein the additional information further comprises an encrypted file name corresponding to a file name of the decompressed file when the storage location of the decompressed file is in the local disk in the terminal device.

13. The computer-implemented system of claim 12, wherein the encrypted file name is generated using an irreversible encryption algorithm.

14. The computer-implemented system of claim 11, wherein the security level is determined based on at least one of a file extension or a file size of the to-be-packaged file.

15. The computer-implemented system of claim 11, wherein the generating a file package comprises:
  generating, by the server, a file package by appending the compressed file after the additional information.

\* \* \* \* \*

UNITED STATES PATENT AND TRADEMARK OFFICE
CERTIFICATE OF CORRECTION

PATENT NO. : 11,100,244 B2  
APPLICATION NO. : 16/888553  
DATED : August 24, 2021  
INVENTOR(S) : Huan Liu and Sen Wang Page 1 of 1

It is certified that error appears in the above-identified patent and that said Letters Patent is hereby corrected as shown below:

In the Claims

Column 13, Line 59, in Claim 5, before "appending" delete "of".

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*